United States Patent Office.

HEINRICH SCHLENK, OF NUREMBERG, GERMANY, ASSIGNOR TO THE FIRM OF CARL REICH, OF SAME PLACE.

MANUFACTURE OF BRONZE TINCTURE.

SPECIFICATION forming part of Letters Patent No. 546,963, dated September 24, 1895.

Application filed February 20, 1895. Serial No. 539,139. (No specimens.)

*To all whom it may concern:*

Be it known that I, HEINRICH SCHLENK, a resident of Nuremberg, Kingdom of Bavaria, Germany, have invented an Improvement in the Manufacture of Bronze Tincture, of which the following is a specification.

My invention relates to the production of bronze tincture, otherwise known as "liquid bronze;" and it consists in the process and composition of matter hereinafter set forth.

My invention has for its particular object to produce a non-inflammable bronze tincture by using as a vehicle for the bronze color a non-inflammable solution of neutralized tetrachloride of carbon.

The bronze tinctures heretofore produced are all more or less inflammable, some of them highly inflammable, and their use and transportation are attended with great danger. This difficulty is entirely obviated by the bronze tincture which forms the subject of this application.

In producing my bronze tincture I take a resin—such as dammar, copal, elemi, mastic, sandarac, &c.—and dissolve the same in tetrachloride of carbon. This solution is subsequently neutralized.

Various resins soluble in tetrachloride of carbon may be used either singly or in combination, so that I would have it understood that I do not mean to limit myself to the resins herein specifically set forth. To this deoxidized solution of resin in tetrachloride of carbon the proper amount of bronze color is then added and incorporated. This produces a bronze color which is non-inflammable. The non-inflammability which characterizes the tetrachloride of carbon obviates the dangers incident and attending the production, conveyance, and use of bronze tinctures.

Having now described my invention, what I claim, and desire to secure by Letters Patent, is—

1. The herein described process for producing non-inflammable bronze tincture, which consists in dissolving resin in tetra chloride of carbon, subsequently neutralizing the liquid and adding bronze color thereto, as specified.

2. The new composition of matter herein described, consisting of bronze powder carried by a vehicle of a neutralized solution of tetrachloride of carbon and gum resin, substantially as described.

The foregoing specification of my improvement in the manufacture of bronze tincture signed by me this 10th day of January, 1895.

HEINRICH SCHLENK.

Witnesses:
 ERNST.
 A. SHAW.